United States Patent [19]

Fitzgerald et al.

[11] 3,752,593
[45] Aug. 14, 1973

[54] PLASTIC PIPE REAMER AND METHOD

[76] Inventors: Harold W. Fitzgerald, 4574 Elizabeth Lake Rd., Pontiac, Mich. 48054; Warren T. Gunther, 2738 Merelus, Pontiac, Mich. 48055

[22] Filed: Sept. 27, 1971

[21] Appl. No.: 183,756

[52] U.S. Cl. .................... 408/1, 408/82, 408/225
[51] Int. Cl. .................... B23b 35/00, B23b 41/06
[58] Field of Search .................... 408/196, 201, 225, 408/209, 1, 79, 80, 81, 82, 227, 86; 29/401; 10/141 R

[56] References Cited
UNITED STATES PATENTS

| | | | |
|---|---|---|---|
| 2,411,246 | 11/1946 | Clapper | 408/1 X |
| 3,645,640 | 2/1972 | Zukas | 408/225 X |
| 1,478,623 | 12/1923 | Valiton | 408/82 |
| 116,418 | 6/1871 | Derby | 408/196 |

FOREIGN PATENTS OR APPLICATIONS

| | | | |
|---|---|---|---|
| 1,070,102 | 5/1967 | Great Britain | 408/79 |

*Primary Examiner*—Andrew R. Juhasz
*Assistant Examiner*—Z. R. Bilinsky
*Attorney*—Harness, Dickey & Pierce

[57] ABSTRACT

A pipe reamer apparatus particularly for use with plastic pipe and a method of reaming plastic pipe fittings such as elbows or the like.

5 Claims, 4 Drawing Figures

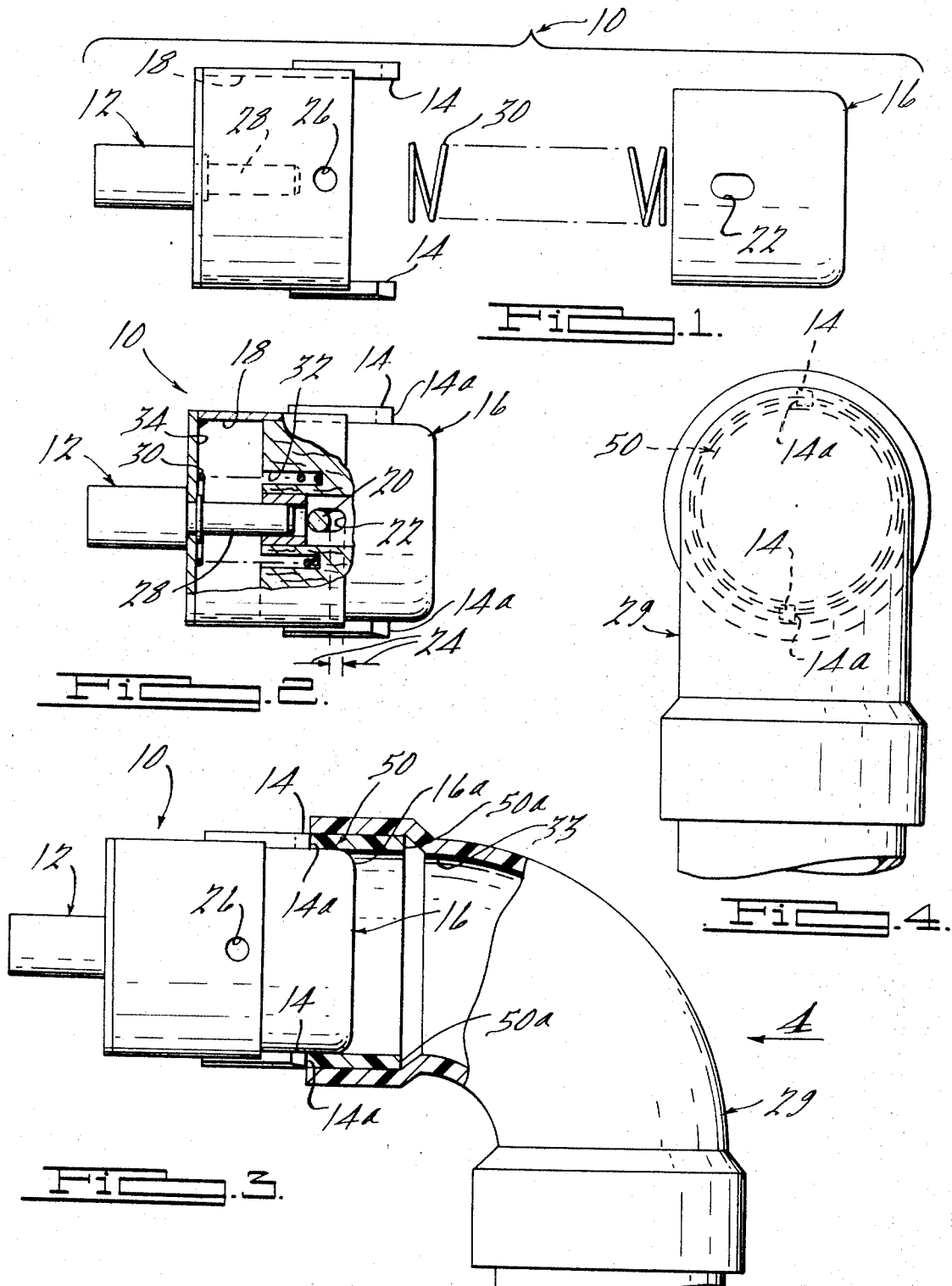

PLASTIC PIPE REAMER AND METHOD

BACKGROUND OF THE INVENTION

This invention broadly relates to a pipe reamer and a method of using same.

The state of the art is indicated by the following U. S. patents which resulted from a preliminary examination, and which references are cited here for the record: Clapper U.S. Pat. No. 2,411,246; Willingham U.S. Pat. Re. No. 24,769; Schuster U.S. Pat. No. 3,202,228; and, Obloy U.S. Pat. No. 3,543,613.

By the term plastic pipe as used herein it is intended to mean plastic pipe in the broadest sense and this includes the known types of plastic pipe which are used as a substitute or replacement for copper pipes and other metal pipes and it is also meant to include hard rubber materials, other elastomer materials, and the like which may be used in piping. Particularly, this invention is applicable to plastic pipe such as is used in commercial plumbing and residential plumbing.

A primary object of this invention is to provide a new pipe reamer and method particularly for use with plastic pipe.

Another object of the present invention is to provide a new plastic pipe reamer means for reaming out a piece of plastic pipe which is positioned in a plastic pipe fitting.

Another object of the present invention is to provide a new method of reaming out pieces of plastic pipe which are positioned within a plastic pipe fitting such as an elbow or Y-type fitting or the like.

Other objects, features, and advantages of the present invention will become apparent from the subsequent description and the appended claims taken in conjunction with the accompanying drawings, wherein like numerals in different figures indicate like elements.

BRIEF DESCRIPTION OF THE DRAWINGS

FIG. 1 illustrates a pipe reamer apparatus in accordance with this invention in an exploded view;

FIG. 2 illustrates the pipe reamer apparatus of FIG. 1 in assembled form with the view of FIG. 2 being partially cut away to show the interior construction of the apparatus;

FIG. 3 illustrates a plastic pipe elbow fitting with the pipe reamer of the invention initially inserted at one end of the elbow just prior to reaming out a piece of plastic pipe which has been lodged in the joint of the elbow; and, FIG. 4 illustrates a side view of FIG. 3 taken in the direction of arrow 4.

SUMMARY OF THE INVENTION

While it is not intended to base this invention on any particular theory of operation, suffice it to say that it has now been discovered that plastic pipe fittings, such as elbow and Y-type fittings, can be used over again to give appreciable economic savings in many cases; and, this result is brought about due to a uniquely constructed plastic pipe reamer apparatus and method which permits a piece of plastic pipe positioned within the fitting to be reamed out without damaging the fitting and thereby enabling the fitting to be reused.

When plastic piping is installed during residential or commercial plumbing work a solvent is normally used to set a piece of straight pipe within a fitting such as an elbow. This solvent joins the pipe and fitting to a permanent set in approximately 30–60 seconds. If the plumber makes a mistake and the fitting is offset from a desired angle, it has in the past been necessary in many instances to cut off the fitting, discard it, and start over again with a new and relatively expensive fitting, pipe length, etc. A highly advantageous remedy to this problem is provided by the inventive discovery herein.

Briefly stated the present invention comprises a plastic pipe reamer means for reaming out a piece of plastic pipe which piece is positioned in a plastic pipe fitting, comprising: bit means for supporting the reamer means cutter means disposed on a part of the bit means for reaming said piece of plastic pipe, pilot means for centering said bit means within said plastic pipe and for bottoming out to prevent said cutter means from entering too deeply said pilot means being positioned at least partially within a hollow portion of the bit means.

From a method aspect, briefly stated, this invention concerns a method of reaming out a piece of plastic pipe which piece is positioned in a plastic pipe fitting such as an elbow fitting and the like, such that the plastic pipe fitting may be used again rather than discarded or the like, said method comprising: cutting off said piece of pipe approximately flush with the end of the fitting, positioning against the piece a plastic pipe reamer means comprising: means for supporting the reamer means cutter means disposed on a part of the supporting means for reaming said piece of pipe, pilot means for centering said supporting means within said pipe and for bottoming out to prevent said cutter means from entering too deeply, and reaming out said piece of plastic pipe.

DESCRIPTION OF PREFERRED EMBODIMENTS

FIGS. 1–3 illustrate a plastic pipe reamer means designated 10 which is comprised of a bit means designated 12, cutter means designated 14, cutter edges 14a positioned at the ends of the cutter means, and pilot means designated 16.

The pilot 16 is held within hollow can shaped member or hollow portion 18 of the bit means 12 by a transverse pin 20 (see FIG. 2) which extends through transverse slot 22 which is drilled or suitably formed in the pilot 16. The pin 20 and the slot 22 enable the pilot 16 to be slidably moved in and out of the hollow can shaped member or hollow portion 18 to the extent of permissible back and forth movement of the pin 20 within the slot 22 as shown by the dimension designated 24. The pin 20 is held fixed relative to the hollow portion 18 due to its being lodged at both sides of the hollow portion 18 within the accommmodating holes 26, best seen in FIG. 1. The pilot member 16 is also guided for slidable back and forth movement within the hollow portion 18 by the centering post member designated 28.

A spring member 30 positioned within an annular channel 32 formed in the pilot member 16 and at its other end positioned in contacting engagement with the wall 34 of the hollow can shaped member 18 acts to outwardly bias the plunger 16 such that the pin 20 is normally in contact with the left end of the slot 22 as seen in FIG. 2.

Operation and usage of the plastic pipe reamer means 10 disclosed herein is as follows. First, the pipe reamer 10 is attached through the bit means 12 to a suitable drill or rotating means not shown. Then the pipe reamer 10 is initially positioned within a plastic pipe member such as the plastic elbow fitting 29 shown in FIG. 3. With the pipe reamer 10 initially positioned as shown in FIG. 3, the drill is started and then cutter means 14 and the cutter edges 14a are rotated to effect reaming out of the piece of plastic designated 50 (which has already been cut off flush with the left extremity of the elbow) lodged in the plastic elbow 29. As the drilling and reaming action continues eventually the the cutter edges 14a approach the end 50a of the piece of plastic 50. As the cutter edges 14a approach the end 50a of the piece of plastic 50, the outer surface 16a of the pilot 16 approaches and gradually makes contact with the inside surface 33 of the plastic elbow fitting. As soon as contact ia made between the end 16a of the pilot and the inside surface 33 of the elbow, then further penetration of the cutter edges 14a is permitted only to the extent of the sliding movement of the pin 20 within the slot 22 shown by the dimension 24 in FIG. 2. When the pin 20 has traveled through the extent of the dimension 24 within the slot 22, then at that instant the cutter edges 14a have reached or just slightly exceeded the end 50a of the piece of plastic 50 which at that instant has been properly reamed out from its position within the elbow fitting 29.

It should be understood, of course, that in accordance with this invention various different predetermined dimensions may be utilized in constructing the pipe reamer 10, so that for example, different sized pipe reamers can be utilized for different sizes of plastic piping and plastic fittings (such as elbow and Y-type plastic fittings of various dimensions). Accordingly, the length of permissible sliding movement between the pilot 16 and the slot 22 and pin 20 arrangement is designed such that once the end 16a of pilot 16 contacts the inside surface 33 of the fitting, further movement of the pipe reamer in an inward penetrating direction is limited such that the cutter edges 14a will only be permitted to ream out the piece of plastic as desired and yet will not be permitted to carry out further harmful cutting which might damage the plastic fitting itself.

While it will be apparent that the preferred embodiments of the invention disclosed are well calculated to fulfill the objects above stated, it will be appreciated that the invention is susceptible to modification, variation, and change without departing from the proper scope or fair meaning of the subjoined claims.

What is claimed is:

1. A plastic pipe reamer means for reaming out a piece of plastic pipe which piece is positioned in a plastic pipe fitting,
    comprising:
        bit means for supporting the reamer means
        cutter means disposed on a part of the bit means for reaming said piece of plastic pipe,
        pilot means for centering said bit means within said plastic pipe and for bottoming out to prevent said cutter means from biasing means for biasing the pilot means away from a bottomed out position before said cutter means has entered to a sufficient extent entering too deeply
        said pilot means being positioned at least partially within a hollow portion of the bit means, and wherein,
        a pin means is utilized to slidably hold the pilot means at least partially within said hollow portion.

2. A pipe reamer means for use with plastic pipe for reaming out a piece of pipe which piece is positioned in a pipe fitting,
    comprising:
        means for supporting the reamer means
        cutter means dipsosed on a part of the supporting means for reaming said piece of pipe,
        pilot means for centering said supporting means within said pipe and for bottoming out to prevent said cutter means from entering too deeply biasing means for biasing the pilot means away from a bottomed out position before said cutter means has entered to a sufficient extent and said cutter means having a cutting width dimension which is approximately equal to one-half the difference between the O.D. and the I.D. of the pipe which is positioned in the pipe fitting.

3. A method of removing a piece of plastic pipe which piece is positioned in a plastic pipe fitting such as an elbow fitting and the like, such that the plastic pipe fitting may be used again rather than discarded or the like,
    said method comprising:
        cutting off said piece of pipe approximately flush with the end of the fitting,
        positioning against the piece of plastic pipe reamer means comprising: means for supporting the reamer means
        cutter means disposed on a part of the supporting means for reaming said piece of pipe,
        pilot means for centering said supporting means within said pipe and for bottoming out to prevent said cutter means from entering too deeply,
        and reaming out said piece of plastic pipe.

4. The invention of claim 3 wherein, there is included biasing means for biasing the pilot means away from a bottomed out position before said cutter means has entered to a sufficient extent.

5. The invention of claim 3 wherein,
a pin means is utilized to slidably hold the pilot means at least partially within said hollow portion.

* * * * *